US012679290B2

(12) United States Patent
Krucker

(10) Patent No.: US 12,679,290 B2
(45) Date of Patent: Jul. 14, 2026

(54) INSULATING ELEMENT

(71) Applicant: SIKA TECHNOLOGY AG, Baar (CH)

(72) Inventor: Roman Krucker, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 351 days.

(21) Appl. No.: 18/285,508

(22) PCT Filed: Jun. 9, 2022

(86) PCT No.: PCT/EP2022/065767
§ 371 (c)(1),
(2) Date: Oct. 4, 2023

(87) PCT Pub. No.: WO2022/258786
PCT Pub. Date: Dec. 15, 2022

(65) Prior Publication Data
US 2024/0181974 A1 Jun. 6, 2024

(30) Foreign Application Priority Data

Jun. 11, 2021 (EP) .................................... 21178950

(51) Int. Cl.
*B60R 13/08* (2006.01)
*B62D 29/00* (2006.01)
(52) U.S. Cl.
CPC ............ *B60R 13/08* (2013.01); *B62D 29/002* (2013.01); *B60R 2013/0807* (2013.01)
(58) Field of Classification Search
CPC . B60R 13/08; B60R 2013/0807; B62D 21/15; B62D 21/157; B62D 25/025; B62D 25/04; B62D 29/002

USPC ...................................................... 296/187.02
See application file for complete search history.

(56) References Cited

U.S. PATENT DOCUMENTS

| | | | |
|---|---|---|---|
| 5,266,133 A | 11/1993 | Hanley et al. | |
| 5,373,027 A | 12/1994 | Hanley et al. | |
| 6,247,287 B1* | 6/2001 | Takabatake | ............ B29C 44/18 |
| | | | 52/843 |

(Continued)

FOREIGN PATENT DOCUMENTS

| | | |
|---|---|---|
| DE | 199 24 641 A1 | 2/2000 |
| EP | 0 204 970 A2 | 12/1986 |

(Continued)

OTHER PUBLICATIONS

Nov. 21, 2023, International Preliminary Report on Patentability issued in International Patent Application No. PCT/EP2022/065767.

(Continued)

*Primary Examiner* — Jason S Daniels
(74) *Attorney, Agent, or Firm* — Oliff PLC

(57) ABSTRACT

An insulating element for insulating a structural element in a vehicle, includes at least two interconnected modules, the modules having essentially an identical design, and wherein a module has in each case a carrier and an expandable material arranged on the carrier. The insulating element further includes at least one fixing element for fixing the insulating element to the structural element, the fixing element being connected to at least one module.

14 Claims, 3 Drawing Sheets

(56) References Cited

U.S. PATENT DOCUMENTS

| | | | | |
|---|---|---|---|---|
| 6,357,819 B1 * | 3/2002 | Yoshino | ............... | B62D 29/002 |
| | | | | 296/187.02 |
| 6,387,470 B1 | 5/2002 | Chang et al. | | |
| 6,494,525 B1 * | 12/2002 | Blank | ..................... | E04C 3/005 |
| | | | | 296/187.02 |
| 7,144,071 B2 * | 12/2006 | Le Gall | ................ | B62D 29/002 |
| | | | | 296/193.06 |
| 12,252,078 B2 * | 3/2025 | Lindgren | ............. | B62D 65/022 |
| 2002/0033617 A1 * | 3/2002 | Blank | ..................... | E04C 3/005 |
| | | | | 296/203.02 |
| 2003/0042056 A1 * | 3/2003 | Schneider | ............ | B62D 29/002 |
| | | | | 180/68.5 |
| 2024/0075663 A1 * | 3/2024 | Thomas | ............ | B29C 45/14631 |

FOREIGN PATENT DOCUMENTS

| | | | |
|---|---|---|---|
| EP | 1 364 862 | A2 | 11/2003 |
| EP | 1 650 112 | A2 | 4/2006 |
| WO | 02/22387 | A1 | 3/2002 |
| WO | 03/020574 | A1 | 3/2003 |
| WO | 2005/080524 | A1 | 9/2005 |

OTHER PUBLICATIONS

Aug. 26, 2022, International Search Report Issued in International Patent Application No. PCT/EP2022/065767.

\* cited by examiner

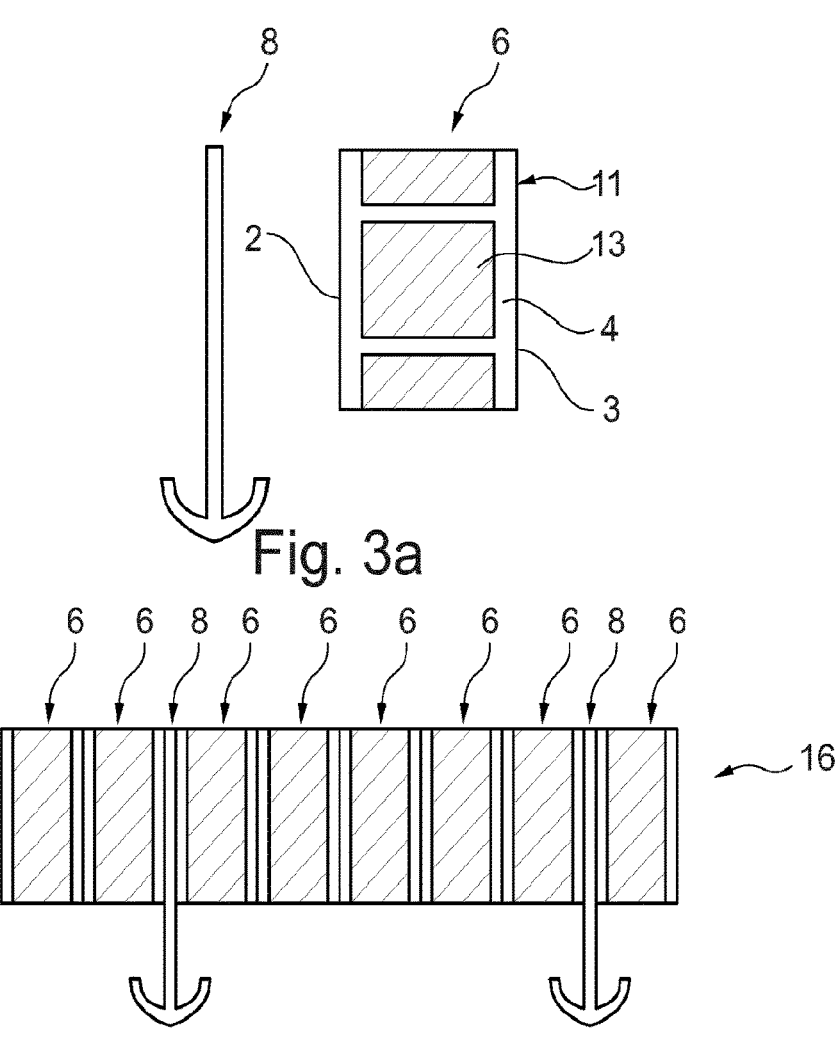
Fig. 3a
Fig. 3b
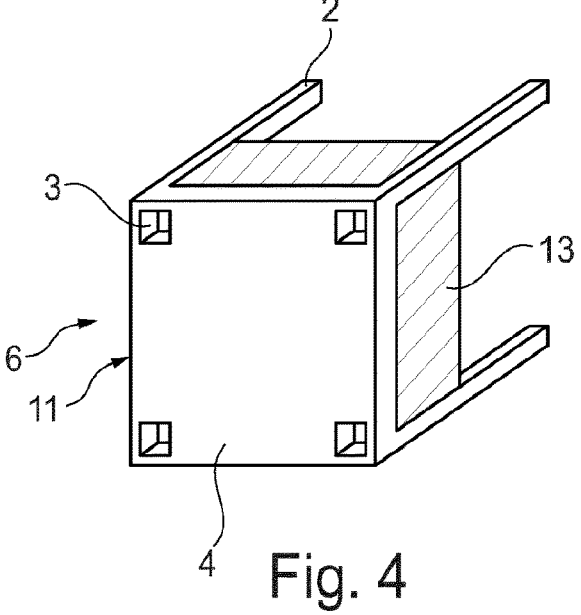
Fig. 4

INSULATING ELEMENT

The invention relates to an insulating element for insulating a structural element in a motor vehicle.

In many cases, components such as, for example, vehicle bodies and/or frames of means of transport and locomotion, especially of water or land vehicles or of aircraft, have structures with cavities in order to enable lightweight constructions. However, these cavities cause a wide variety of problems. Depending on the type of the cavity, the latter has to be sealed in order to prevent the ingress of moisture and soiling, which can lead to corrosion of the components. It is often also desirable to substantially reinforce the cavities and hence the element, but to maintain the low weight. It is often also necessary to stabilize the cavities and hence the components, in order to reduce noise which would otherwise be transmitted along or through the cavity. Many of these cavities have an irregular shape or a narrow extent, which makes it more difficult to seal, reinforce and insulate them properly.

Especially in automotive construction, but also in aircraft construction and boatbuilding, sealing elements (baffles) are therefore used in order to seal and/or acoustically insulate cavities, or reinforcing elements (reinforcers) are used in order to reinforce cavities.

Figure 1:
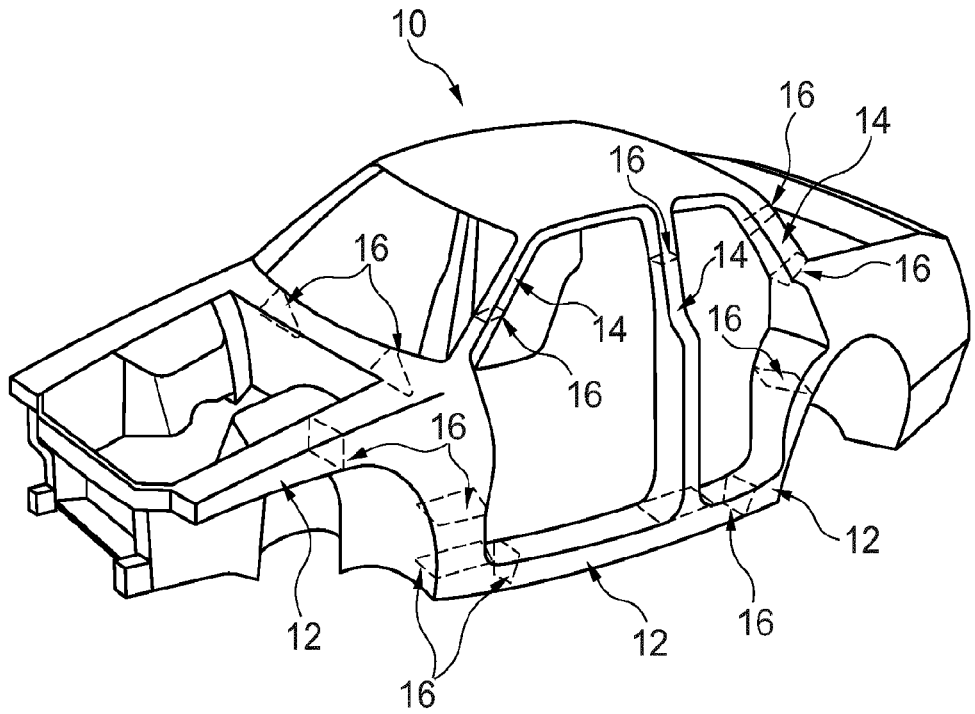

FIG. 1 shows a schematic a body of an automobile. The vehicle body 10 here has various structures with cavities, for example pillars 14 and beams or crossbeams 12. Such structural elements 12, 14 with cavities are typically sealed and/or reinforced using sealing elements and reinforcing elements 16 respectively.

It is a disadvantage of the previously known sealing and/or reinforcing elements that, for each vehicle body shape and for each cavity of a vehicle body, an individually adapted element has to be produced. This results in high development and production costs and is disadvantageous in particular in the case of relatively small vehicle series.

It is therefore an object of the present invention to provide an improved insulating element for insulating a structural element in a motor vehicle, which avoids the drawbacks of the prior art. The insulating element is intended to give rise in particular to economic advantages in the case of small series and to reduce the development and production complexity of the insulating elements overall.

This object is achieved by an insulating element for insulation of a structural element in a motor vehicle, the insulating element comprising: at least two mutually connected modules, also called interconnected modules, meaning modules that are connected to each other, wherein the modules are essentially identical, and wherein each module has a carrier and an expandable material arranged/disposed on the carrier; and at least one fixing element for fixing the insulating element on the structural element, wherein the fixing element is connected to at least one module.

A core concept of the present invention is in particular that standardized constituents (modules and fixing elements) can create a multitude of different insulating elements with which a multitude of differently shaped cavities can be insulated. This offers the advantage that the modules for formation of the insulating elements can be produced in large numbers, which is advantageous with regard to tool costs and development costs. In the case of injection molding processes in particular, a large number of items is necessary in order to be able to produce in a cost-efficient manner.

In the context of this invention, the term "insulating element" or "insulation" or "insulated" covers elements or structures or method steps for partitioning and/or closing off and/or insulating a structural element. These various characteristics of such an insulating element can arise individually or in combination with one another.

In an illustrative embodiment, the insulating element has at least two fixing elements for fixing the insulating element to the structural element.

Such a configuration has the advantage that this allows the insulating element to be fixed more reliably on the structural element, especially with respect to twisting.

In an illustrative development, at least one module is arranged between the two fixing elements.

In an illustrative development, at least two or at least three or at least four modules are arranged between the two fixing elements.

In an illustrative embodiment, at least one module is not arranged between the two fixing elements.

Such a configuration has the advantage that this allows better foam filling of a region in the area of a fixing element.

In an illustrative embodiment, the insulating element has at least three or at least four or at least five modules.

In an illustrative embodiment, the modules in an installed state of the insulating element are in a mutually covering arrangement in the direction of a longitudinal axis of the structural element, meaning the modules are arranged covering each other in the direction of a longitudinal axis.

In an illustrative embodiment, the carrier has at least one support wall which, in an installed state of the insulating element, runs essentially orthogonal to the longitudinal axis of the structural element.

Such a configuration has the advantage that expansion of the expandable material is thereby guided by the contact wall, in a direction radially away from the longitudinal axis of the insulating element. This allows more efficient foam filling cavities and structural elements, or lower material input is necessary.

In an illustrative development, the carrier has two mutually connected support walls aligned essentially parallel to one another.

Such a configuration has the advantage that expansion is thereby guided even better in radial direction away from a longitudinal axis of the insulating element, such that more controlled and more efficient foaming can be achieved.

In an illustrative embodiment, the expandable material is arranged on the support wall.

In an illustrative embodiment, the expandable material has a thickness of 5 to 20 mm, preferably of 8 to 17 mm, more preferably of 10 to 15 mm.

In an illustrative embodiment, the modules each have a first coupling element and a second coupling element, wherein adjacent modules are connected to one another via these coupling elements.

In a first illustrative development, these coupling elements take the form of plug connections. In this case, for example, first coupling element may take the form of a plug that can be inserted into a second coupling element in the form of an opening.

In an illustrative development, the coupling elements have a twist-proof design. For example, a cross section of the coupling elements for this purpose may have a bulge or the like.

In a second illustrative development, these coupling elements take the form of a snap-fitting securing clip. In this case, for example, a first coupling element may take the form of a clip that can be inserted into a second coupling element in the form of a corresponding clip opening.

In a third illustrative development, these coupling elements take the form of bonding surfaces. In this case, a first coupling element may take the form of a surface that can be bonded to a second coupling element, likewise in the form of a surface.

In an illustrative development, the two surfaces are essentially flat or contrary to one another. This offers the advantage that it is thus possible to achieve a greater bond area.

In an illustrative embodiment, the at least two modules and the at least one fixing element are connected to one another by the coupling elements such that the individual elements cannot be moved relative to one another. In particular, the individual elements are rigidly bonded to one another.

In an illustrative embodiment, a module has a length and width that are each measured relative to a longitudinal axis of the structural element in an installed state of the insulating element.

In an illustrative embodiment, the length of a module is between 10 and 80 mm, preferably between 15 and 50 mm, more preferably between 20 and 35 mm.

In an illustrative embodiment, the width of a module is between 10 and 80 mm, preferably between 15 and 50 mm, more preferably between 20 and 35 mm.

In an illustrative embodiment, a thickness of the expandable material, measured along the longitudinal axis of the structural element in an installed state of the insulating element, is between 30% and 95% of the length of a module, likewise measured along a longitudinal axis of the structural element in an installed state of the insulating element.

In an illustrative development, the thickness of the expandable material is between 40% and 90% or between 50% and 85% of the length of a module.

In an illustrative embodiment, an outline of a module is square or circular. In an illustrative development, the outline of a module corresponds essentially to the outline of the support wall.

Such a configuration has the advantage that this can achieve uniform filling with foam in all directions radially away from a longitudinal axis of the insulating element.

In an illustrative embodiment, the fixing element takes the form of a clip, especially of a snap-fitting securing clip.

In an alternative embodiment, the fixing element takes the form of a loop or hook.

In an illustrative embodiment, the fixing element has a first coupling element and a second coupling element, wherein the coupling elements of the fixing element are compatible with the coupling elements of the modules.

In an illustrative development, the coupling elements are the same as described above for the coupling elements of the modules.

Expandable Material

The expandable material used may in principle be various materials that can be made to foam. This material may or may not have reinforcing properties. Typically, the expandable material is made to expand thermally, by moisture or by electromagnetic radiation.

Such an expandable material typically has a chemical or a physical blowing agent. Chemical blowing agents are organic or inorganic compounds which decompose under the influence of temperature, moisture or electromagnetic radiation, wherein at least one of the decomposition products is a gas. Physical blowing agents used may, for example, be compounds that are converted to the gaseous state of matter with increasing temperature. As a result, both chemical and physical blowing agents are capable of creating foam structures in polymers.

The expandable material is preferably foamed thermally, using chemical blowing agents. Examples of suitable chemical blowing agents are azodicarbonamides, sulfohydrazides, hydrogencarbonates or carbonates.

Suitable blowing agents are, for example, also commercially available under the trade name Expancel® from Akzo Nobel, the Netherlands, or under the trade name Celogen® from Chemtura Corp., USA.

The heat required for the foaming can be introduced by external or by internal heat sources, such as an exothermic chemical reaction. The foamable material is preferably foamable at a temperature of ≤250° C., especially of 100° ° C. to 250° C., preferably of 120° C. to 240° C., preferably of 130° C. to 230° C.

Suitable expandable materials are, for example, one-component epoxy resin systems which do not flow at room temperature and in particular have elevated impact resistance and contain thixotropic agents such as aerosils or nanoclays. For example, epoxy resin systems of this type include 20% to 50% by weight of a liquid epoxy resin, 0% to 30% by weight of a solid epoxy resin, 5% to 30% by weight of impact modifiers, 1% to 5% by weight of physical or chemical blowing agents, 10% to 40% by weight of fillers, 1% to 10% by weight of thixotropic agents and 2% to 10% by weight of heat-activatable curing agents. Suitable impact modifiers are reactive liquid rubbers based on nitrile rubber or derivatives of polyether polyol polyurethanes, core-shell polymers and similar systems known to a person skilled in the art.

Likewise suitable expandable materials are one-component polyurethane compositions containing blowing agents and based on crystalline polyesters which have OH groups and have been mixed with further polyols, preferably polyether polyols, and polyisocyanates with blocked isocyanate groups. The melting point of the crystalline polyester should be ≥50° C. The isocyanate groups of the polyisocyanate may be blocked, for example, by nucleophiles such as caprolactam, phenols or benzoxalones. Also suitable are blocked polyisocyanates as used, for example, in powder-coating technology, and commercially available, for example, under the Vestagon® BF 1350 and Vestagon® BF 1540 trade names from Degussa GmbH, Germany. Suitable isocyanates are also what are called encapsulated or surface-deactivated polyisocyanates, which are known to a person skilled in the art and are described, for example, in EP 0 204 970.

Also suitable as expandable materials are two-component epoxy/polyurethane compositions which contain blowing agents, as described, for example, in WO 2005/080524 A1.

Also suitable as expandable materials are ethylene-vinyl acetate compositions containing blowing agents.

Expandable materials that are also suitable are sold by Sika Corp., USA, for example under the SikaBaffle® 240, SikaBaffle® 250 or SikaBaffle® 255 trade name, and are described in U.S. Pat. Nos. 5,266,133 and 5,373,027. Such expandable materials are particularly preferred for the present invention.

Preferred expandable materials with reinforcing properties are for example those marketed by Sika Corp., USA under the trade name SikaReinforcer® 941. These are described in U.S. Pat. No. 6,387,470.

In an illustrative embodiment, the expandable material has an expansion rate of 800% to 5000%, preferably of 1000% to 4000%, more preferably of 1500% to 3000%. Expandable materials having such expansion rates offer the advantage that it is possible thereby to achieve reliable sealing and/or insulation of the structural element with respect to liquids and sound.

In an illustrative embodiment, the expandable material is in the form of a temperature-stimulated material.

This has the advantage that it is possible thereby to use the furnace for baking the dip coating liquid in order to expand the expandable material and hence to insulate the cavity. Consequently, no additional working step is required.

Carrier

The carrier may consist of any desired materials. Preferred materials are plastics, especially polyurethanes, polyamides, polyesters and polyolefins, preferably polymers which can withstand high temperatures such as poly(phenylene ethers), polysulfones or polyether sulfones, which in particular are also foamed; metals, especially aluminum and steel; or grown organic materials, especially wood materials or other (densified) fibrous materials, or vitreous or ceramic materials; especially also foamed materials of this type; or any desired combinations of these materials. Particular preference is given to using polyamide, especially nylon-6, nylon-6,6, nylon-11, nylon-12 or a mixture thereof.

Furthermore, the carrier may have any desired construction and any desired structure. It may for example be solid, hollow or foamed, or have a meshlike structure. Typically, the surface of the carrier may be smooth, rough or structured.

In the case of insulating elements in which the expandable material is on a carrier, the production process differs according to whether or not the carrier consists of a material that can be processed by injection molding. If this is the case, a two-component injection molding process is typically used. This involves first injecting a first component, in this case the carrier. After said first component has solidified, the cavity in the mold is enlarged, or adapted, or the molding produced is placed into a new mold, and a second component, in this case the expandable material, is overmolded onto the first component by a second injection apparatus.

If the carrier consists of a material that cannot be produced by the injection molding process, i.e., for example, consists of a metal, the carrier is placed into a corresponding mold and the expandable material is overmolded onto the carrier. Of course, it is also possible to fasten the expandable material to the carrier by specific fastening means or processes.

Furthermore, carriers can also be produced by other processes, for example by extrusion.

System

The object stated at the outset is additionally achieved by a system in a motor vehicle, the system comprising: a structural element which has a cavity; and an insulating element according to the description above; wherein the insulating element is arranged in the cavity of the structural element.

In an illustrative embodiment, the structural element is a portion of a column or of a beam or crossbeam of a motor vehicle body.

Figures 2A, 2B, 2C, 2D:
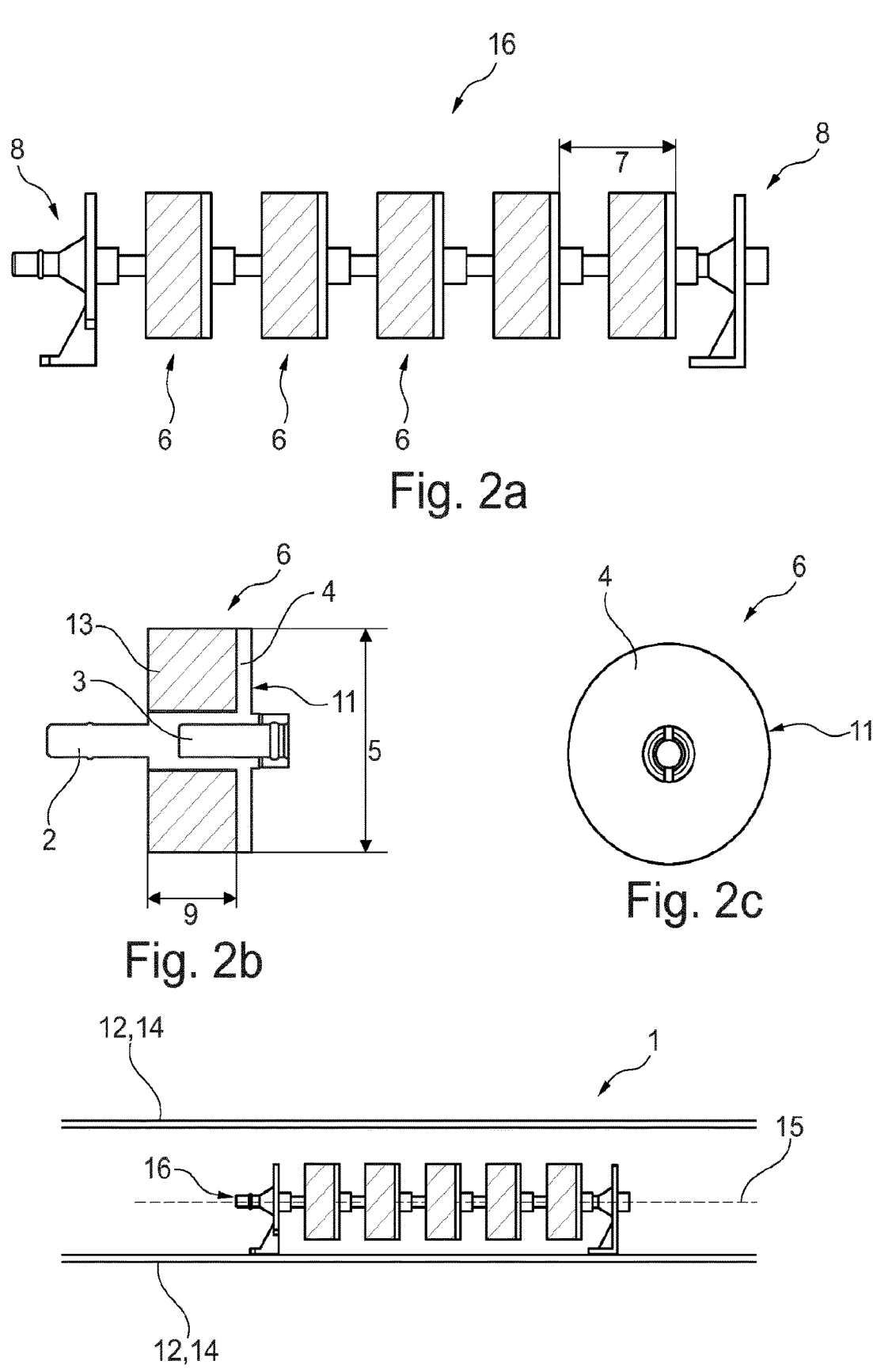

Details and advantages of the invention will be described hereinafter using working examples and with reference to schematic drawings. The figures show:

FIG. 1 an illustrative diagram of a vehicle body;

FIGS. 2a to 2d a schematic diagram of an illustrative insulating element or constituents thereof;

FIGS. 3a and 3b a schematic diagram of an illustrative insulating element or constituents thereof;

FIG. 4 a schematic diagram of an illustrative module;

FIGS. 2a to 2d show an illustrative insulating element 16, or constituents thereof, in schematic form. FIG. 2a shows the whole insulating element 16, FIG. 2b shows a cross section through a single module 6 of the insulating element 16, FIG. 2c shows a top view of a single module 6 of the insulating element 16, and FIG. 2d shows an insulating element 16 in the installed state in a structural element 12, 14.

In this working example, the insulating element 16 comprises five modules 6 and two fixing elements 8. All the modules 6 are arranged between the two fixing elements 8.

The modules 6 and the fixing elements 8 each have compatible coupling elements 2, 3, via which adjacent elements 6, 8 are connected to one another. In this example, the coupling elements 2, 3 take the form of a plug connection.

The modules 6 in this working example have a round outline. The carrier 11 has a support wall 4 designed such that it runs essentially orthogonal to a longitudinal axis 15 of the structural element 12, 14 in an installed state of the insulating element 16. The expandable material 13 is arranged on this support wall 4. In the case of expansion of the expandable material 13, the expansion is guided by the support wall 4 in directions that run radially away from the longitudinal axis 15 of the structural element 12, 14. This leads to particularly efficient foam filling of a cavity of the structural element 12, 14.

The modules 6 have a width 5 and a length 7, wherein the length 7 relates to a length in the installed state (FIG. 2a). The expandable module 13 has a thickness 9 which is measured in a direction of the longitudinal axis 15 of the structural element 12, 14 in an installed state of the actuating element 16 (FIG. 2b). This thickness 9 of the expandable material 13 may correspond, for example, to about 50% of the length 7 of the module 6, as shown in this working example.

FIGS. 3a and 3b show a further working example of an insulating element 16 or the constituents 6, 8 thereof in schematic form. In this example, the modules 6 each have two support walls 4, wherein the expandable material 13 is arranged between these two support walls 4. The support walls 4 are connected to one another by two fins surrounded by expandable material 13.

The coupling elements 2, 3 in this working example take the form of bonding surfaces. These bonding surfaces of the modules 6 and of the fixing elements 8 are matched to one another, such that the constituents 6, 8 are compatible with one another, in order that different insulating elements 16 may thereby be formed from the same constituents 6, 8.

The inflating elements 16 in FIG. 3b comprises eight modules 6 and two fixing elements 8, with five modules 6 arranged between the fixing elements 8, and three modules 6 not arranged between the fixing elements 8.

FIG. 4, finally, shows a schematic of a third working example of a module 6. In this working example, the coupling elements 2, 3 comprise a multitude of pinlike projections and a multitude of assigned openings. Again, the carrier 11 has a support wall 4 against which the expandable material 13 is arranged/disposed.

LIST OF REFERENCE SIGNS

1 System
2 First coupling element
3 Second coupling element
4 support wall
5 Width (of a module)

6 Module
7 Length (of a module)
8 Fixing element
9 Thickness of the expandable material
10 Vehicle body
11 Carrier
12 Structural element
13 Expandable material
14 Structural element
15 Longitudinal axis
16 Insulating element

The invention claimed is:

1. An insulating element for insulating a structural element in a motor vehicle, the insulating element comprising:
  at least two mutually connected modules, wherein:
    the modules are essentially identical,
    the modules each have a first coupling element and a second coupling element,
    adjacent modules are connected to one another via the first coupling element and the second coupling element,
    at least one of the following conditions is fulfilled:
      (i) the modules are connected to one another via the first coupling element and the second coupling element such that the modules cannot be moved relative to one another, or
      (ii) the first coupling element and the second coupling element take the form of plug connections or snap-fitting securing clips, and
    a module has a carrier and an expandable material arranged on the carrier; and
  at least one fixing element for fixing the insulating element on the structural element, wherein the fixing element is connected to at least one module.

2. The insulating element as claimed in claim 1, wherein the insulating element has at least two fixing elements for fixing the insulating element to the structural element.

3. The insulating element as claimed in claim 2, wherein at least one module is arranged between the two fixing elements.

4. The insulating element as claimed in claim 2, wherein at least one module is not arranged between the two fixing elements.

5. The insulating element as claimed in claim 1, wherein the insulating element has at least three or at least four or at least five modules.

6. The insulating element as claimed in claim 1, wherein the modules in an installed state of the insulating element are in a mutually covering arrangement in the direction of a longitudinal axis of the structural element.

7. The insulating element as claimed in claim 1, wherein the carrier has at least one support wall which, in an installed state of the insulating element, runs essentially orthogonal to the longitudinal axis of the structural element.

8. The insulating element as claimed in claim 7, wherein the carrier has two mutually connected support walls aligned essentially parallel to one another.

9. The insulating element as claimed in claim 7, wherein the expandable material is arranged on the support wall.

10. The insulating element as claimed in claim 1, wherein an outline of a module is square or circular.

11. The insulating element as claimed in claim 1, wherein the expandable element has a thickness of 5 to 20 mm.

12. The insulating element as claimed in claim 1, wherein the fixing element takes the form of a clip or loop or hook.

13. The insulating element as claimed in claim 1, wherein the fixing element has a first coupling element and a second coupling element, and wherein the first coupling element and the second coupling element of the fixing element are compatible with the first coupling element and the second coupling element of the modules.

14. A system in a motor vehicle, the system comprising:
  a structural element which has a cavity; and
  the insulating element as claimed in claim 1;
  wherein the insulating element is arranged in the cavity of the structural element.

* * * * *